(12) United States Patent
Vanderhoek (10) Patent No.: US 9,296,466 B2
(45) Date of Patent: Mar. 29, 2016

(54) SYMMETRIC WING RIB WITH CENTER PLANE FASTENED SHEAR TIES

(71) Applicant: The Boeing Company, Chicago, IL (US)

(72) Inventor: John David Vanderhoek, Indianola, WA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 13/923,841

(22) Filed: Jun. 21, 2013

(65) Prior Publication Data

US 2015/0298790 A1 Oct. 22, 2015

(51) Int. Cl.
*B64C 3/18* (2006.01)
*B64F 5/00* (2006.01)
*B64C 3/26* (2006.01)

(52) U.S. Cl.
CPC . *B64C 3/187* (2013.01); *B64C 3/26* (2013.01); *B64F 5/00* (2013.01)

(58) Field of Classification Search
CPC .......... B64C 3/18; B64C 3/182; B64C 3/187; B64C 1/06; B64C 1/061; Y02T 50/42
See application file for complete search history.

(56) References Cited

U.S. PATENT DOCUMENTS

| | | | |
|---|---|---|---|
| 7,578,473 B2 | 8/2009 | Shortman | |
| 7,721,995 B2 * | 5/2010 | Tanner et al. | 244/132 |
| 8,001,690 B2 | 8/2011 | Shortman | |
| 2008/0173757 A1 * | 7/2008 | Tanner et al. | 244/119 |
| 2008/0210821 A1 * | 9/2008 | Tanner et al. | 244/123.3 |
| 2009/0200418 A1 * | 8/2009 | Beaufort | 244/54 |
| 2012/0148801 A1 | 6/2012 | Kwon et al. | |
| 2014/0209745 A1 * | 7/2014 | Hosokawa et al. | 244/123.1 |

FOREIGN PATENT DOCUMENTS

| | | |
|---|---|---|
| EP | 2336 021 A2 | 6/2011 |
| FR | 1396 979 A | 4/1965 |
| FR | 2550 754 A1 | 2/1985 |
| GB | 157310 | 6/1922 |

OTHER PUBLICATIONS http://www.compositesworld.com/articles/a400m-wing-assembly-challenge-of-integrating-composites Jan. 28, 2013.
http://www.bing.com/images/search?q=wing+a380&qpvt=wing+cracks+a380&FORM=IGRE#view=detail&id=9F96F72112B6D4623B5E182C5B3B0FE5686FA63B&selectedIndex=0 Sep. 14, 2012.

(Continued)

*Primary Examiner* — Philip J Bonzell
*Assistant Examiner* — Christopher Hutchens
(74) *Attorney, Agent, or Firm* — McDonnell Boehnen Hulbert & Berghoff LLP (57) ABSTRACT

A symmetrical rib structure and methods are presented. A structural web comprises a web center plane and a plurality of web stiffeners, and is symmetrical about the web center plane. A flange is configured on a periphery of the symmetrical rib structure, and a fastener hole is configured in the flange and comprises a fastener hole centerline aligned with the web center plane. A cutout is configured in the structural web around the fastener hole, and two support columns are coupled to the flange on opposite sides of the cutout.

17 Claims, 11 Drawing Sheets

(56) References Cited

OTHER PUBLICATIONS

Extended European Search Report EP14173180.2 mailed Nov. 5, 2014.

Office Action issued in Canadian Patent Application No. 2,847,635, dated Apr. 2, 2015.

Patent Examination Report No. 1 issued in Australian Patent Application No. 2014201864 dated May 26, 2015.

* cited by examiner

FIG. 3
EXISTING ART

FIG. 4

FIG. 5
EXISTING ART

SYMMETRIC WING RIB WITH CENTER PLANE FASTENED SHEAR TIES

FIELD

Configurations of the present disclosure relate generally to aircraft structure. More particularly, configurations of the present disclosure relate to aircraft wing ribs.

BACKGROUND

Wing ribs are aircraft detail parts that are typically machined out of aluminum plate stock and are used to construct a wing torque box. A commercial airliner may contain as many as a hundred ribs or more. The main functions of wing ribs are to react aerodynamic loads and maintain the aerodynamic shape of the wing skins. Thousands of fasteners are typically required to install all of the ribs on a commercial wing. This activity is in the critical path of aircraft assembly. Fasteners can be the single biggest cost item on a wing. These fasteners are typically installed in a single or double row through "shear tie feet" around the periphery of an asymmetric rib.

SUMMARY

A symmetrical rib structure and methods are presented. A structural web comprises a web center plane and a plurality of web stiffeners, and is symmetrical about the web center plane. A flange or a shear tie foot is configured on a periphery of the symmetrical rib structure. A fastener hole is configured in the flange and comprises a fastener hole centerline aligned with the web center plane. A cutout in the structural web is configured around the fastener hole, and two support columns are coupled to the flange on opposite sides of the cutout.

In this manner, a symmetric shape of a symmetric wing rib structure allows a single row of large fasteners to be installed around the periphery of the symmetric wing rib structure on a plane of symmetry of the wing rib structure. The symmetric wing rib structure improves the efficiency of the load path during flight and as a result reduces a number of fasteners required for the symmetric wing rib structure installation which reduces the overall weight of the symmetric wing rib structure and the airplane. Thus reduces cost of airplane wing construction by requiring fewer fasteners. Also, a more efficient load path reduces the weight of the wing by requiring less metal or composite to react the same aerodynamic load.

In a configuration, a symmetrical rib structure comprises a structural web, a flange, a fastener hole, a cutout, and two support columns. The structural web comprises a web center plane and a plurality of web stiffeners, and symmetrical about the web center plane. The flange is configured on a periphery of the symmetrical rib structure. The fastener hole is configured in the flange and comprises a fastener hole centerline aligned with the web center plane. A cutout is configured in the structural web around the fastener hole. The two support columns are coupled to the flange on opposite sides of the cutout.

In another configuration, a method for configuring a symmetrical rib structure configures a structural web comprising a web center plane and a plurality of web stiffeners, and symmetrical about the web center plane. The method further configures a flange configured on a periphery of the symmetrical rib structure, and configures a fastener hole configured in the flange and comprising a fastener hole centerline aligned with the web center plane. The method further configures a cutout in the structural web around the fastener hole, and configures two support columns coupled to the flange on opposite sides of the cutout.

In a further configuration, a method for single sided fastening of a symmetrical rib structure positions a symmetrical rib structure in an assembly location. The symmetrical rib structure comprises a structural web comprising a web center plane and a plurality of web stiffeners, and symmetrical about the web center plane, and a flange configured on a periphery of the symmetrical rib structure. The symmetrical rib structure further comprises an assembly side comprising one of: a first side of the symmetrical rib structure relative to the web center plane, or a second side of the symmetrical rib structure opposite the first side relative to the web center plane. The symmetrical rib structure further comprises a fastener hole from a plurality of fastener holes configured in the flange and comprising a fastener hole centerline aligned with the web center plane. A cutout is configured in the structural web around the fastener hole, two support columns are coupled to the flange on opposite sides of the cutout. The method further inserts a single fastener from fasteners into the cutout in the structural web from only the assembly side, and positions the fastener in the fastener hole from only the assembly side. The method further inserts a fastener tool into the cutout in the symmetrical rib structure from only the assembly side, and couples the fastener tool to the fastener. The method further operates the fastener tool from only the assembly side to couple the fastener to one or more objects.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of configurations of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the configurations of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Configurations of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft, aircraft components, aircraft manufacturing, and other functional aspects of the systems (and the individual operating components of the systems) may not be described in detail herein. In addition, those skilled in the art will appreciate that configurations of the present disclosure may be practiced in conjunction with a variety of structural bodies, and that the configurations described herein are merely example configurations of the disclosure.

Configurations of the disclosure are described herein in the context of some non-limiting applications, namely, an aircraft. Configurations of the disclosure, however, are not limited to such aircraft, and the techniques described herein may also be utilized in other applications. For example, configurations may be applicable to submarines, spacecraft, hydroplanes, or other application using a structural rib.

As would be apparent to one of ordinary skill in the art after reading this description, the following are examples and configurations of the disclosure and are not limited to operating in accordance with these examples. Other configurations may be utilized and structural changes may be made without departing from the scope of the exemplary configurations of the present disclosure.

Figure 1:
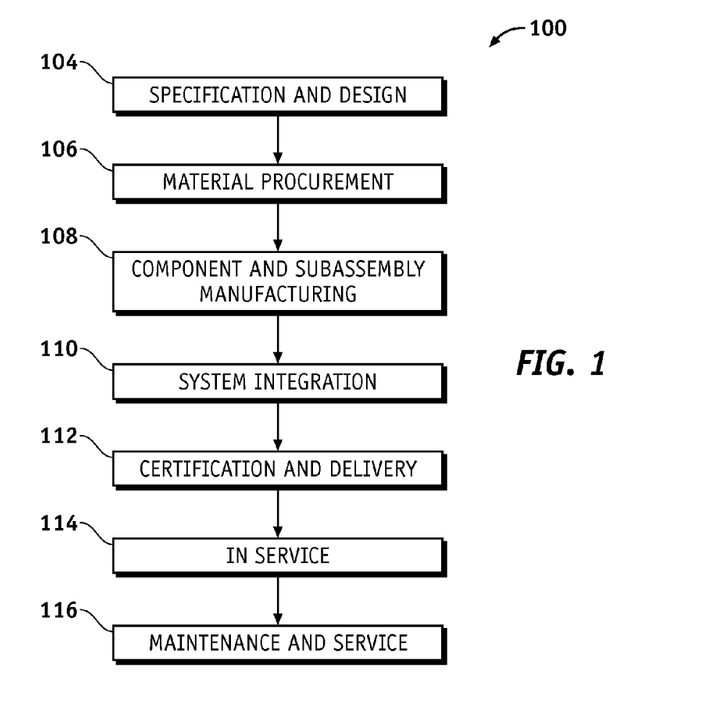
FIG. 1 is an illustration of a flow diagram of an exemplary aircraft production and service methodology.
Figure 2:
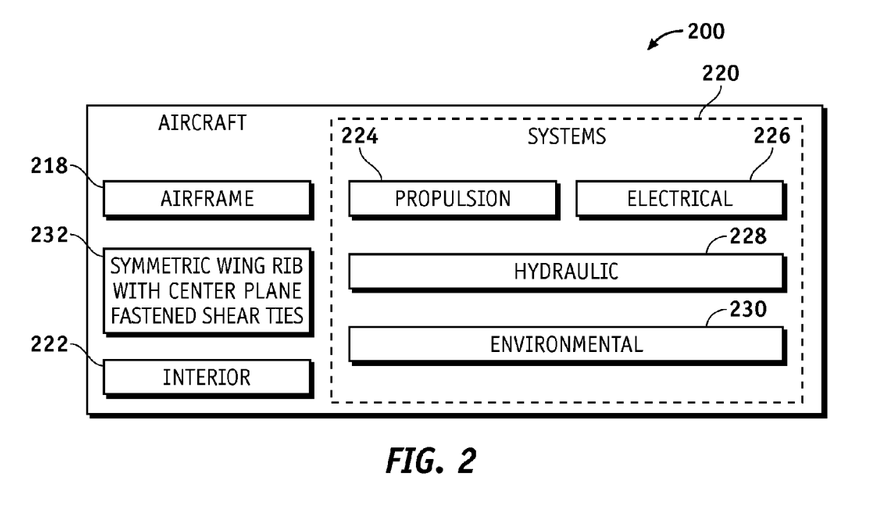
FIG. 2 is an illustration of an exemplary block diagram of an aircraft

Referring more particularly to the drawings, configurations of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental control system 230, and one or more symmetrical wing rib with center plane fastened shear tie 232. Any number of other systems may also be included. Although an aerospace example is shown, the configurations of the disclosure may be applied to other industries.

Apparatus and methods configured herein may be employed during any one or more of the stages of the method 100. For example, components or subassemblies corresponding to production process 108 may be fabricated or manufactured in a manner similar to components or subassemblies produced while the aircraft 200 is in service. In addition, one or more apparatus configurations, method configurations, or a combination thereof may be utilized during production processes 108 and 110, for example, by substantially expediting assembly of or reducing the cost of an aircraft 200. Similarly, one or more of apparatus configurations, method configurations, or a combination thereof may be utilized while the aircraft 200 is in service, for example and without limitation, to maintenance and service 116.

Figure 3:
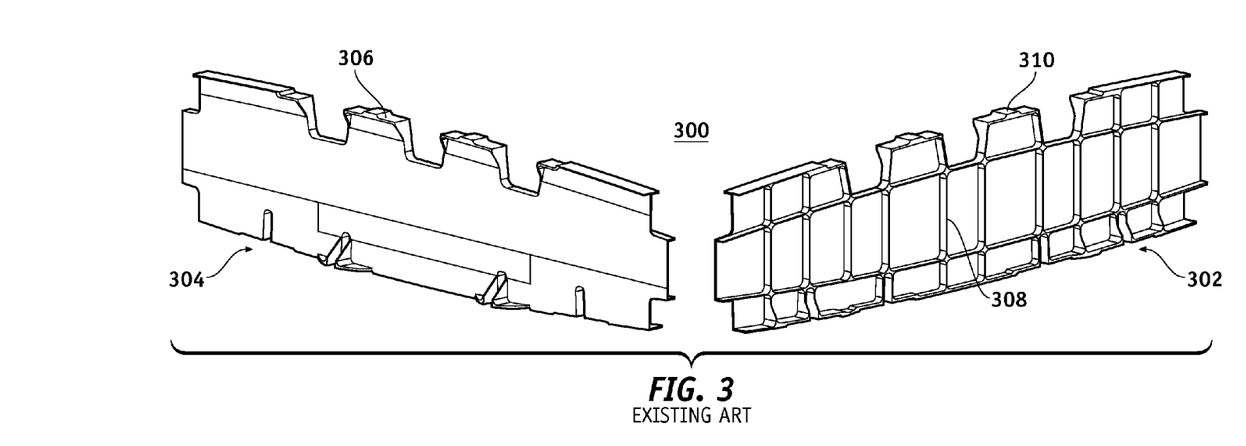
FIG. 3 is an illustration of an asymmetric wing rib.

FIG. 3 is an illustration of an asymmetric wing rib structure 300 of an existing configuration showing a first side 302 and a second side 304 opposite to the first side 302. The asymmetric wing rib structure 300 may cause cracks on rib feet 306 originating from skin panel attachment holes and caused by high stress and type of material used for manufacturing the asymmetric wing rib structure 300. The asymmetric wing rib structure 300 may also cause cracks in vertical flange 308 of the asymmetric wing rib structure 300.

Figure 4:
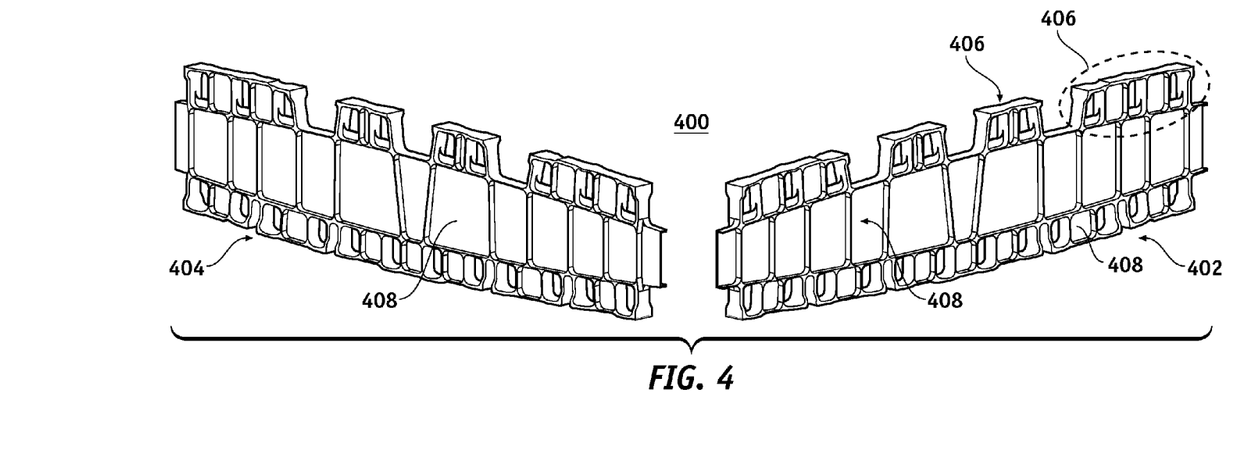
FIG. 4 is an illustration of a symmetric wing rib according to a configuration of the disclosure.

FIG. 4 is an illustration of a symmetric wing rib structure 400 showing a first side 402 and a second side 404 opposite to the first side 402 according to a configuration of the disclosure. The symmetric wing rib structure 400 comprises shear ties 406, and structural webs 408. The symmetric wing rib structure 400 is configured to remove eccentric loading, and thus improve efficiency of a load path during flight as explained in more detail below.

Figure 5:
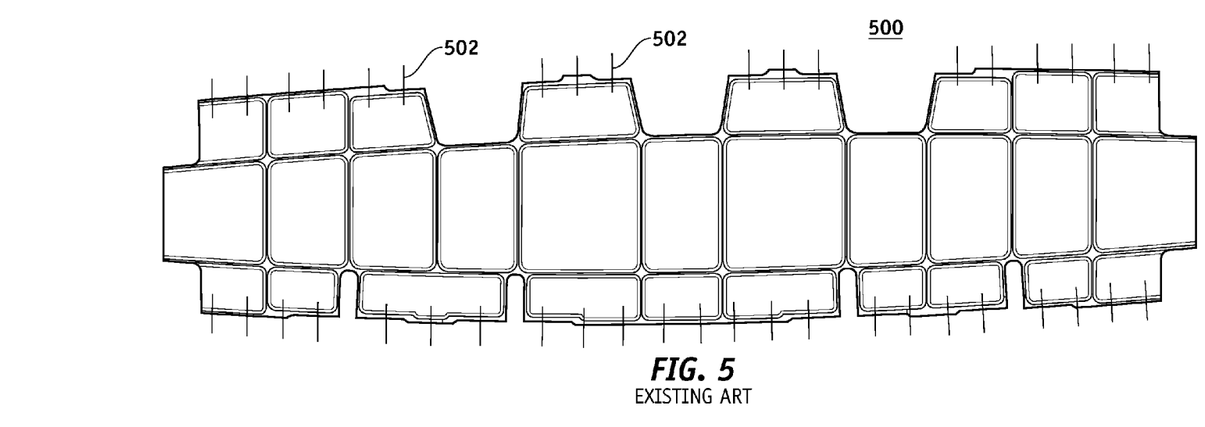
FIG. 5 is an illustration of an existing asymmetric wing rib showing an exemplary number of fasteners required.

FIG. 5 is an illustration of an existing asymmetric wing rib structure 500 showing a number of fasteners 502 required. While FIG. 5 shows the number of fasteners 502 on one side of the existing asymmetric wing rib structure 500, an equal number is also required on an opposite side. Thus, the existing asymmetric wing rib structure 500 requires assembly operations to be performed on both sides of the existing asymmetric wing rib structure 500.

Figure 6:
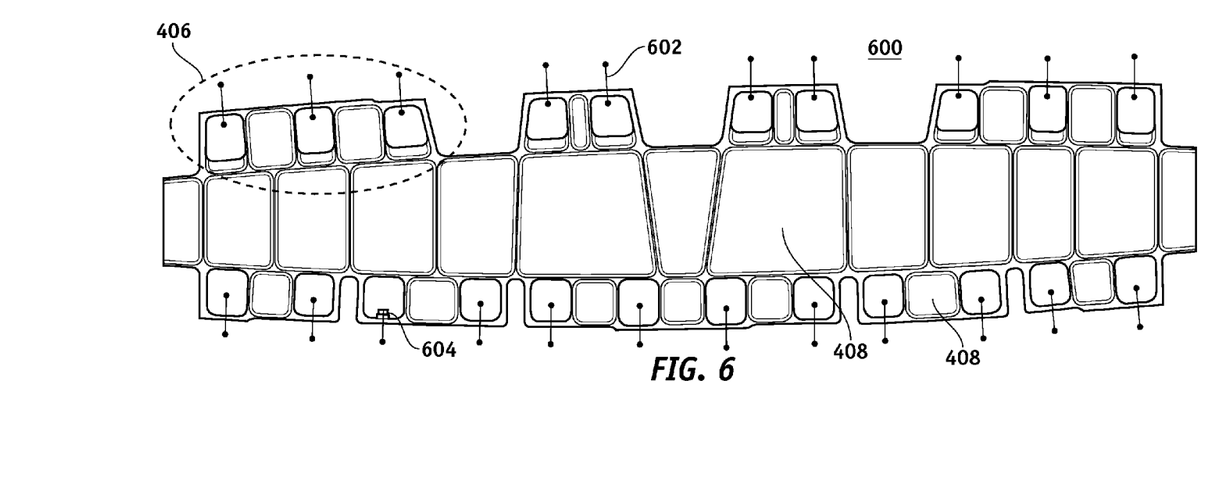
FIG. 6 is an illustration of a symmetrical wing rib showing less fasteners are required according to a configuration of the disclosure compared to the number of fasteners required for the asymmetric wing rib of FIG. 5.

FIG. 6 is an illustration of a symmetrical wing rib structure 600 showing fewer fasteners 602 are required according to a configuration of the disclosure compared to the number of fasteners 502 required for the asymmetric wing rib structure 500 of FIG. 5. A symmetric shape of the symmetric wing rib structure 600 allows a single row of large fasteners 604 to be installed around the periphery 728 (FIG. 7) of the symmetric wing rib structure 600 aligned with a web center plane 608 (FIG. 6A) of the structural web 408. In this manner, the large fasteners 604 are aligned with the web center plane 608 and remove eccentric loading, thus efficiency of a load path during flight improves and as a result the number of large fasteners 604 required for rib installation is reduced.

For example, about 63 fastener 502 may be required to install the asymmetric wing rib structure 500 compared to about 22 fasteners 602 required to install the symmetrical wing rib structure 600. In this manner, a significant cost and weight saving for the symmetrical wing rib structure 600 and the aircraft 200 is provided.

Figure 6A:
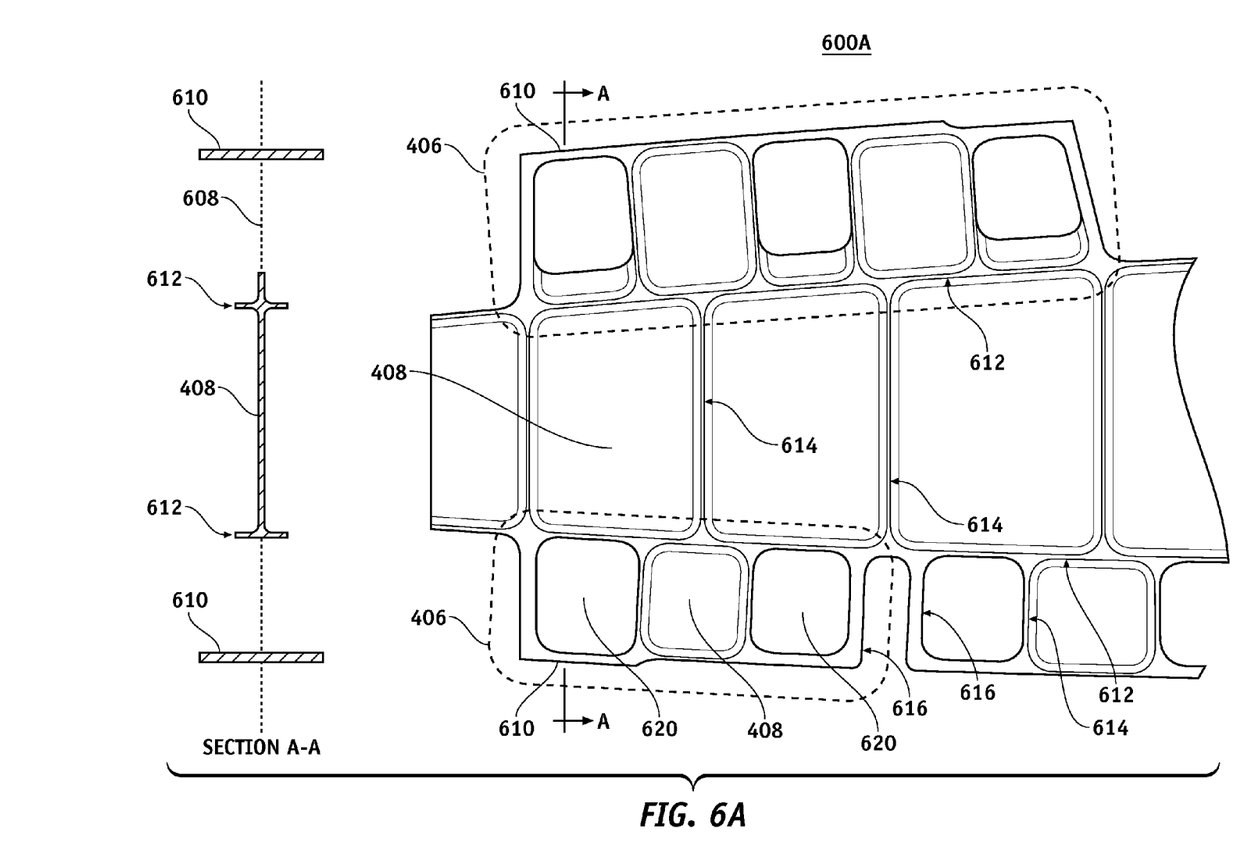
FIG. 6A is an illustration of an expanded view of a portion of the symmetrical wing rib structure according to a configuration of the disclosure

FIG. 6A is an illustration of an expanded view 600A of a portion of the symmetrical wing rib structure 600 according to a configuration of the disclosure. The expanded view 600A shows: the shear tie 406, the structural web 408 (rib web), a shear tie foot 610, a structural web chord 612 (rib chord), a structural web stiffener 614, and a shear tie support column 616. The web center plane 608 is shown on a cross section taken along a line AA.

Figure 7:
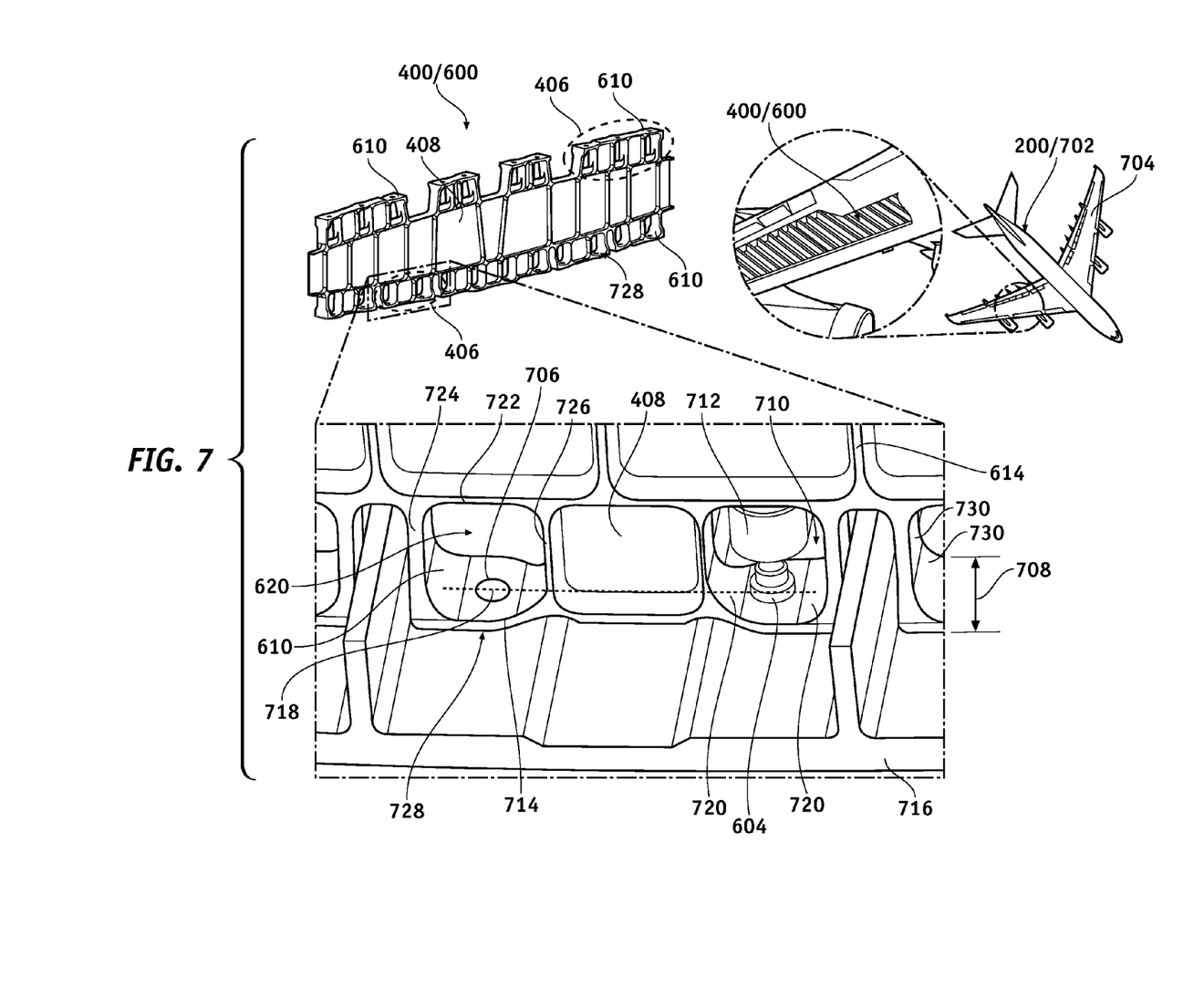
FIG. 7 is an illustration of a symmetrical wing rib installed in an aircraft wing according to a configuration of the disclosure.

FIG. 7 is an illustration of the symmetrical wing rib structure 400/600 installed in an aircraft 200/702 wing 704 according to a configuration of the disclosure. The symmetrical wing rib structure 600 comprises the structural web 408 comprising the web center plane 608 (FIG. 6A) and the structural web stiffeners 614, and is symmetrical about the web center plane 608. The structural web 408 is configured to separate fastener holes 706. A flange 714 is configured on the periphery of the symmetrical wing rib structure 400/600. The flange 714 may comprise the shear tie foot 610. A fastener hole 706 is configured in the flange 714 and comprises a fastener hole centerline 718 aligned with the web center plane 608. An open surface 720 of the flange 714 is configured around the fastener hole 706. An opening such as a shear tie cutout 620 is configured through the structural web 408 around the fastener hole 706. Two support columns 724 and 726 are coupled to the flange 714 on opposite sides of the shear tie cutout 620. The support columns 724 and 726 may comprise the structural web stiffener 614, or other support element. The shear tie cutout 620 provides clearance 710 along the support columns 724/726 and defines a volume sized to accept the large fastener 604 and a tooling component 712 to fasten the large fastener 604. Large fastener 604 and fastener 604 may be used interchangeably in this document.

Figure 8:
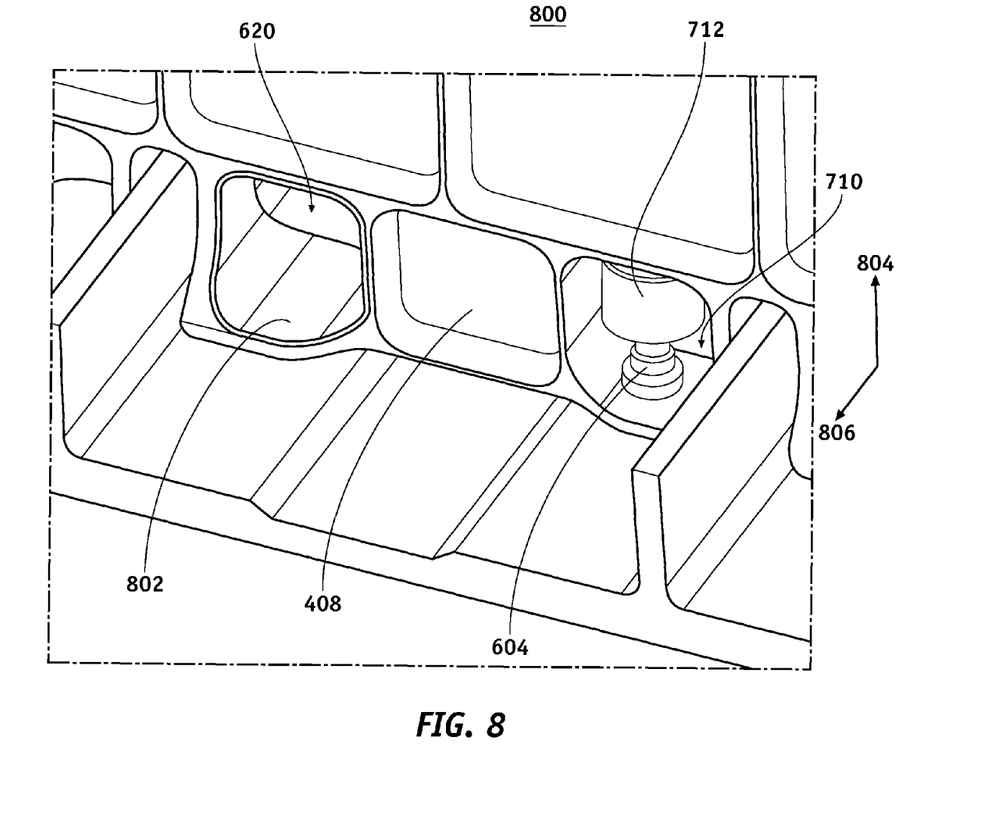
FIG. 8 is an illustration of an expanded view of a portion of a symmetrical wing rib showing a shrink fit sleeve repair according to a configuration of the disclosure.

FIG. 8 is an illustration of an expended view 800 of a portion of the symmetrical wing rib structure 600 showing a shrink fit sleeve repair 802 according to a configuration of the disclosure. The shrink fit sleeve repair 802 covers the fastener hole 706 and the interior surfaces 730 (FIG. 7) of the shear tie cutout 620 of the structural web 408. An out direction 804 and an outboard direction 806 indicate an exemplary orientation of the shear tie cutout 620. The shrink fit sleeve repair 802 is used in an event that an anomaly occurs to the shear tie 406 in the interior surfaces 730 of the shear tie cutout 620. The anomaly may comprise, for example but without limitation, a gouge, a scratch, a manufacturing flaw, and other anomaly. The shrink fit sleeve repair 802 provides additional strength to the shear tie cutout 620 to restore a strength that may be taken away by the anomaly. The shrink fit sleeve repair 802 may be prefabricated using a similar material (e.g., aluminum, composite, or other suitable material) as the symmetrical rib structure 600 and to fit in an interference fashion. Installation can be performed by cooling the shrink fit sleeve repair 802 so that the shrink fit sleeve repair 802 thermally contracts such that a clearance fit up is possible (e.g., briefly possible).

Figure 9:
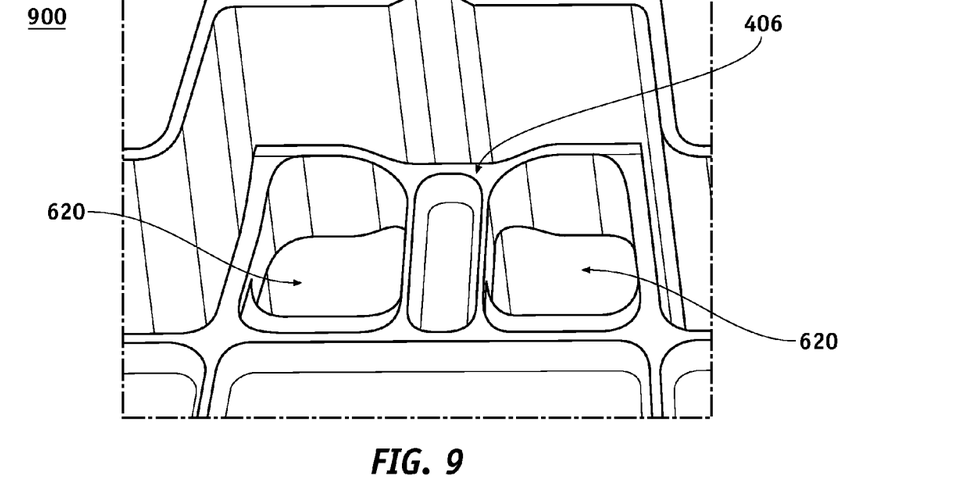
FIG. 9 is an illustration of an expanded view of a portion of a symmetrical wing rib showing a shear tie configuration according to a configuration of the disclosure.

FIG. 9 is an illustration of an expanded view 900 of a portion of the symmetrical wing rib structure 600 showing the shear tie 406 configuration according to a configuration of the disclosure.

Figure 10:
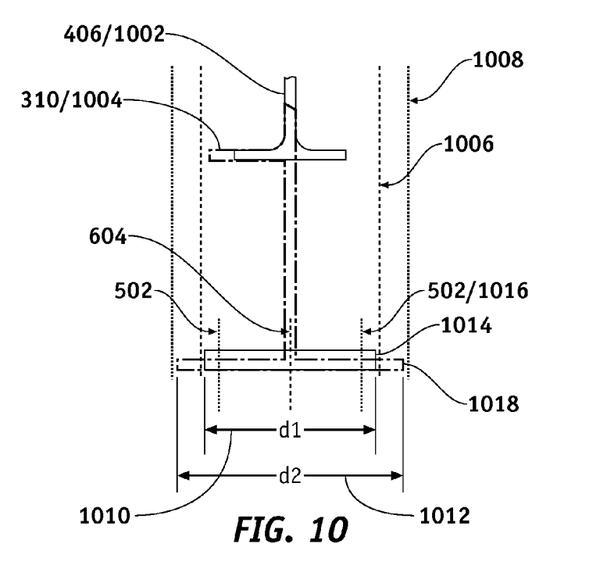
FIG. 10 is an illustration of an overlay comparing a shear tie cross section according to a configuration of the disclosure to an existing shear tie cross section.

FIG. 10 is an illustration of an overlay comparing a shear tie cross section 1002 of the shear tie 406 of the symmetrical wing rib structure 600 according to a configuration of the disclosure to a shear tie cross section 1004 of the shear tie 310 of the asymmetric wing rib structure 300. A single large fastener such as the large fastener 604 in the flange 714 reduces stock size (material size) requirement as shown by the raw stock envelope 1006 (raw material envelope) of the shear tie 406. In contrast, using multiple fasteners 502 as required by the asymmetric wing rib structure 300 results in a raw stock envelope 1008 larger than the raw stock envelope 1006.

This is because strength requirements dictate a minimum edge distance from a fastener hole centerline to an edge of a part such the shear tie 310/406. Dimension d1 1010 defines a minimum edge distance required for the fastener hole centerline 718 (FIG. 7) to an edge 1014 of the shear tie 406 of the symmetrical wing rib structure 600. Similarly, dimension d2 1012 defines a minimum edge distance required for a fastener hole centerline 1016 to an edge 1018 of the shear tie 310 of the asymmetric wing rib structure 300. As shown in FIG. 10, d1 1010 is less than d2 1012.

Figure 11:
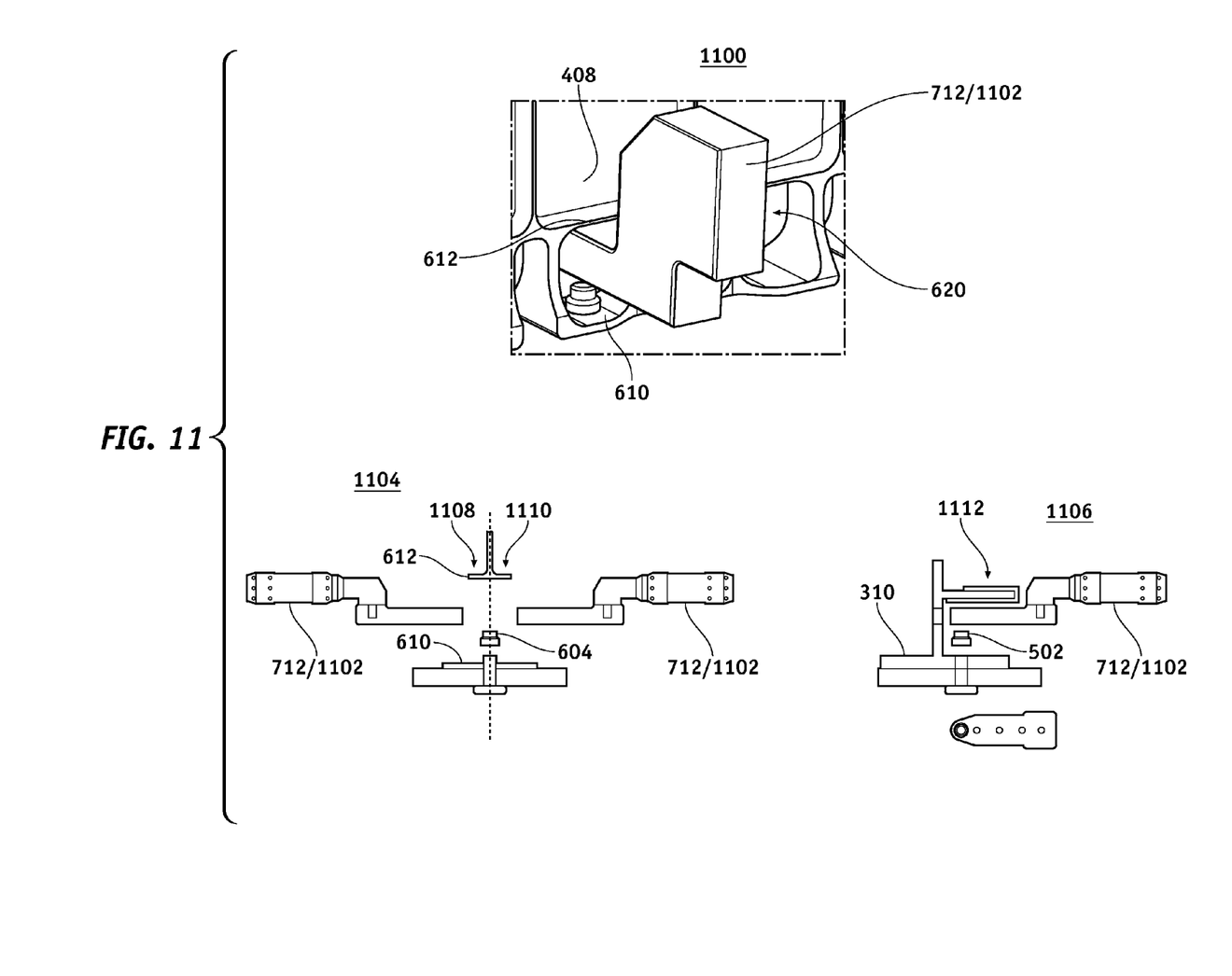
FIG. 11 is an illustration of positioning of a symmetrical wing rib structure in an assembly location for fastening of a symmetrical rib structure from either side according to a configuration of the disclosure, and compared to a positioning of an asymmetric wing structure in an assembly location.

FIG. 11 is an illustration of positioning 1100/1104 of the symmetrical wing rib structure 600 in an assembly location for fastening of a symmetrical rib structure 600 from either side according to a configuration of the disclosure compared to a positioning 1106 of the asymmetric wing structure 300 (existing asymmetric wing rib structure 300). As shown in the positioning 1100/1104, the symmetrical wing rib structure 600 comprises an assembly side comprising either a first side 1108 relative to the web center plane 608 (FIG. 6A), or a second side 1110 opposite the first side 1108 relative to the web center plane 608.

In this manner, the large fastener 604 is inserted into the shear tie cutout 620 from either the side 1108 or the side 1110 of the shear tie cutout 620. The large fastener 604 is positioned in the fastener hole 706 from either the side 1108 or the side 1110 of the shear tie cutout 620. A fastener tool 712/1102 (tooling component 712/1102) is inserted into the shear tie cutout 620 from either the side 1108 or the side 1110 of the shear tie cutout 620. The fastener tool 712/1102 is coupled to the large fastener 604. Thus, the fastener tool 712/1102 may be operated from either the side 1108 or the side 1110 of the shear tie cutout 620 to couple the large fastener 604 to one or more objects such as a mating skin panel 716.

In contrast to the positioning 1100/1104 of the symmetrical wing rib structure 600, positioning 1106 of the existing asymmetric wing structure 300 in an assembly location shows the fastener 502 is inserted into the shear tie 310 of the asymmetric wing structure 300 from one side 1112 thereof. Thus, a fastening tool such as the fastener tool 712/1102 is operated from the one side 1112 of the existing asymmetric wing structure 300 to couple the fastener 502 to one or more objects such as the mating skin panel 716. In this manner, the existing asymmetric wing structure 300 may require assembly operations to be performed on both sides (e.g., to fasten fasteners on both sides since they may not be accessible from one side) of the existing asymmetric wing structure 300. Thus, existing asymmetric wing rib structures may limit assembly options.

Figure 12:
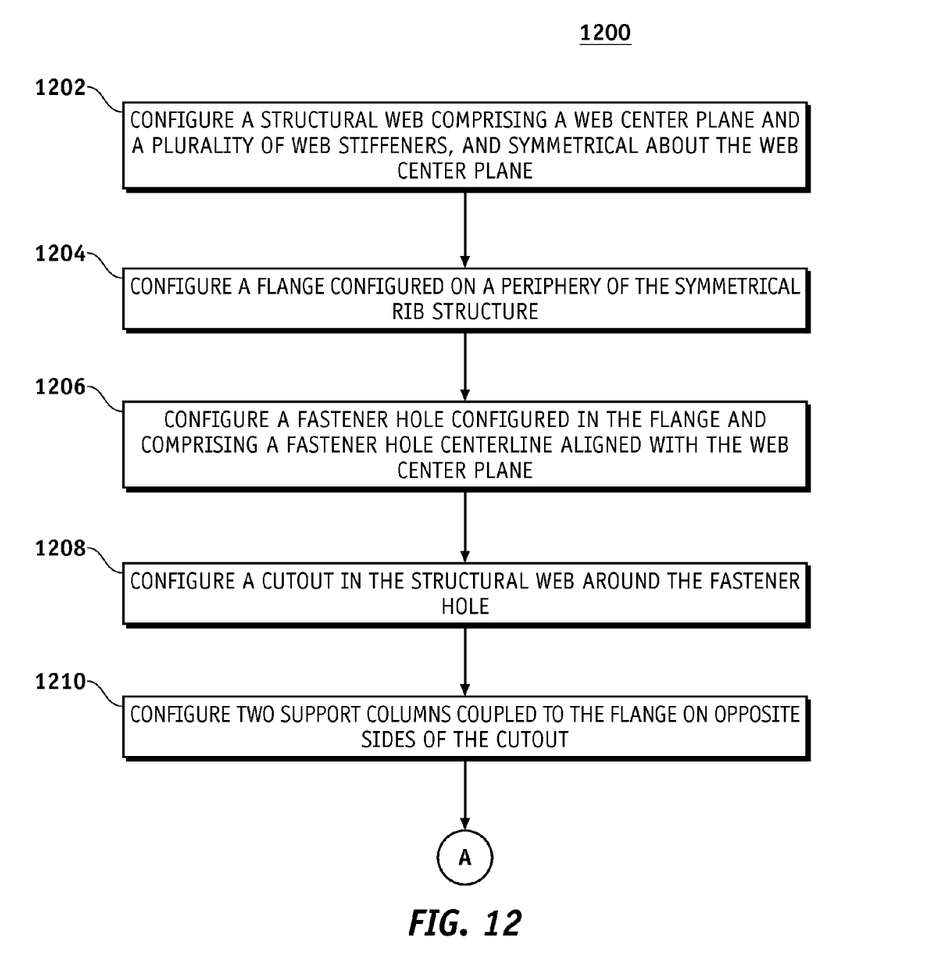
FIG. 12 is an illustration of an exemplary flowchart showing a process for configuring a symmetric wing rib according to a configuration of the disclosure.

FIG. 12 is an illustration of an exemplary flowchart showing a process for configuring a symmetric wing rib according to a configuration of the disclosure. The various tasks performed in connection with process 1200 may be performed mechanically, by software, hardware, firmware, or any combination thereof. For illustrative purposes, the following description of process 1200 may refer to elements mentioned above in connection with FIGS. 1-2, 4 and 6-11. In some configurations, portions of the process 1200 may be performed by different elements of the symmetrical wing rib structure 400/600 such as: the shear tie cutouts 620, the structural web 408, the fastener holes 706, the flange 714, the periphery 728, the fastener hole centerline 718, the web center plane 608, the shear tie cutout 620 the support columns 724 and 726, the clearance 710, the tooling component 712/1102, etc. Process 1200 may have functions, material, and structures that are similar to the configurations shown in FIGS. 1-2, 4 and 6-11. Therefore common features, functions, and elements may not be redundantly described here.

Process 1200 may begin by configuring a structural web comprising a web center plane and a plurality of web stiffeners, and symmetrical about the web center plane (task 1202).

Process 1200 may continue by configuring a flange configured on a periphery of the symmetrical rib structure (task 1204).

Process 1200 may continue by configuring a fastener hole configured in the flange and comprising a fastener hole centerline aligned with the web center plane (task 1206).

Process 1200 may continue configuring a cutout in the structural web around the fastener hole (task 1208).

Process 1200 may continue by configuring two support columns coupled to the flange on opposite sides of the cutout (task 1210).

Process 1200 may continue by configuring the cutout to define a volume sized to accept a fastener and a tooling component to fasten the fastener (task 1212).

Process 1200 may continue by configuring the cutout to comprise clearance along the two support columns (task 1214).

Process 1200 may continue by covering the fastener hole and interior surfaces of the cutout by a shrink fit sleeve repair (task 1216).

Process 1200 may continue by installing a single row of fasteners on the web center plane of the structural web of the symmetrical rib structure allowing for a narrow width of the symmetrical rib structure (task 1218).

Process 1200 may continue by configuring the cutout to comprise a shear tie cutout comprising a single fastener of the fasteners in the flange allowing reduced stock size (task 1220).

Process 1200 may continue by installing the symmetrical rib structure in an aircraft wing (task 1222).

Figure 13:
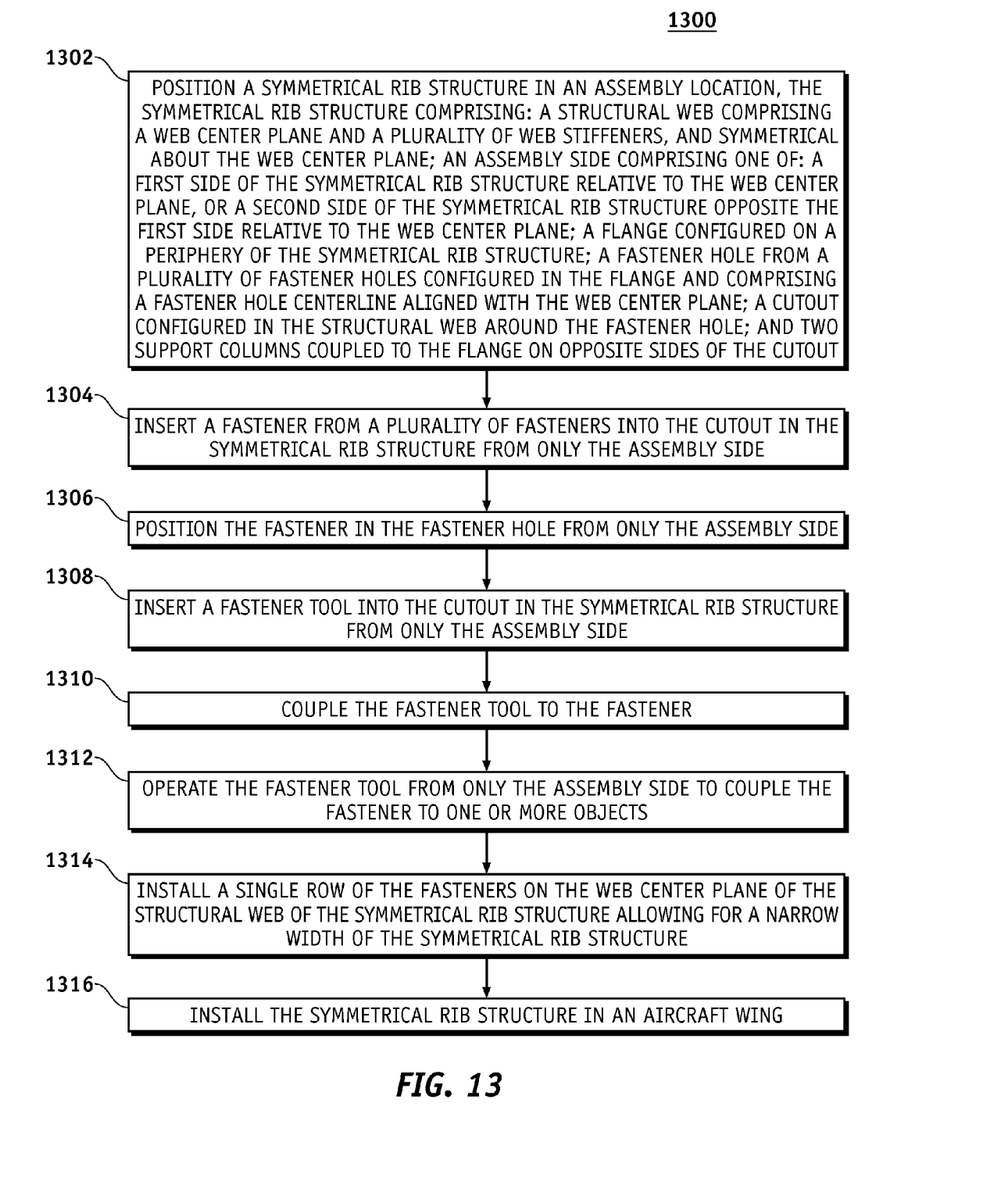
FIG. 13 is an illustration of an exemplary flowchart showing a process for a single sided fastening of a symmetrical rib structure according to a configuration of the disclosure.

FIG. 13 is an illustration of an exemplary flowchart showing a process for a single sided fastening of a symmetrical rib structure according to a configuration of the disclosure. The various tasks performed in connection with process 1300 may be performed mechanically, by software, hardware, firmware, or any combination thereof. For illustrative purposes, the following description of process 1300 may refer to elements mentioned above in connection with FIGS. 1-2, 4, and 6-11. In some configurations, portions of the process 1300 may be performed by different elements of the symmetrical wing rib structure 400/600 such as: the shear tie cutouts 620, the structural web 408, the fastener holes 706, the flange 714, the periphery 728, the structural web 408, the fastener hole centerline 718, the web center plane 608, the support columns 724 and 726, the shear tie cutout 620, the clearance 710, the tooling component 712/1102, etc. Process 1300 may have functions, material, and structures that are similar to the configurations shown in FIGS. 1-2, 4 and 6-11. Therefore common features, functions, and elements may not be redundantly described here.

Process 1300 may begin by positioning a symmetrical rib structure in an assembly location (task 1302). The symmetrical rib structure comprises: a structural web comprising a web center plane and a plurality of web stiffeners, and symmetrical about the web center plane; an assembly side comprising one of: a first side of the symmetrical rib structure relative to the web center plane, or a second side of the symmetrical rib structure opposite the first side relative to the web center plane; a flange configured on a periphery of the symmetrical rib structure; a fastener hole from a plurality of fastener holes configured in the flange and comprising a fastener hole centerline aligned with the web center plane; a cutout configured in the structural web around the fastener hole; and two support columns coupled to the flange on opposite sides of the cutout.

Process 1300 may continue by inserting a fastener into the cutout in the symmetrical rib structure from only the assembly side (task 1304).

Process 1300 may continue by positioning the fastener in the fastener hole from only the assembly side (task 1306).

Process 1300 may continue by inserting a fastener tool into the cutout in the symmetrical rib structure from only the assembly side (task 1308).

Process 1300 may continue by coupling the fastener tool to the fastener (task 1310).

Process 1300 may continue by operating the fastener tool from only the assembly side to couple the fastener to one or more objects (task 1312).

Process 1300 may continue by installing a single row of the fasteners on the web center plane of the structural web of the symmetrical rib structure allowing for a narrow width of the symmetrical rib structure (task 1314)

Process 1300 may continue by installing the symmetrical rib structure in an aircraft wing (task 1316)

In this way, a symmetrical web structure is provided that allows a single row of large centerline fasteners. In this manner fewer fasteners are used with an associated cost savings. Using fewer fasteners to install the symmetrical rib structure in an aircraft wing also enables a smoother aerodynamic wing surface, reduced aircraft drag, and improved aircraft performance. A single row of centerline fasteners means raw stock size can be reduced along with the associated cost. A symmetric rib design means an improved load path and a lighter, more durable design. Unique cutouts of the symmetrical rib structure for fasteners means installation can be performed from either side of the cutouts. Also, fewer fasteners means less treatment for electromagnetic effects and a cost/weight savings.

While at least one example configuration has been presented in the foregoing detailed description, it should be appreciated that a vast number of variations exist. It should also be appreciated that the example configuration or configurations described herein are not intended to limit the scope, applicability, or configuration of the subject matter in any way. Rather, the foregoing detailed description will provide those skilled in the art with a convenient road map for implementing the described configuration or configurations. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" should be interpreted to mean that one element/node/feature is directly joined to (or directly communicates with) another element/node/feature, and not necessarily mechanically. Likewise, unless expressly stated otherwise, "coupled" should be interpreted to mean that one element/node/feature is directly or indirectly joined to (or directly or indirectly communicates with) another element/node/feature, and not necessarily mechanically. Thus, although FIGS. 1-2, 4, 6, 7-9 and 11 depict example arrangements of elements, additional intervening elements, devices, features, or components may be present in a configuration of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases shall not be read to mean that the narrower case is intended or required in instances where such broadening phrases may be absent.

The term "about" when referring to a numerical value or range is intended to encompass values resulting from experimental error that can occur when taking measurements.

The invention claimed is:

1. A symmetrical rib structure comprising:
a structural web comprising a plurality of web stiffeners, wherein the structural web and the plurality of web stiffeners are arranged symmetrical about a web center plane such that the symmetrical rib structure has a first side relative to the web center plane and a second side opposite the first side relative to the web center plane;
a flange configured on a periphery of the symmetrical rib structure;
a fastener hole configured in the flange and comprising a fastener hole centerline aligned with the web center plane;
a cutout is configured in the structural web around the fastener hole, wherein the cutout comprises a shear tie cutout and the flange comprises a shear tie foot; and
two shear tie support columns are coupled to the flange on opposite sides of the cutout and a structural web chord arranged on an opposite side of the cutout from the flange.

2. The symmetrical rib structure of claim 1, further comprising a plurality of cutouts and a plurality of fastener holes that are defined in the flange, wherein the structural web is configured to separate each of the plurality of fastener holes.

3. The symmetrical rib structure of claim 1, further comprising a fastener aligned with the web center plane of the structural web and configured to remove eccentric loading.

4. The symmetrical rib structure of claim 1, wherein the cutout defines a volume sized to accept a fastener and a tooling component to fasten the fastener.

5. The symmetrical rib structure of claim 1, wherein the fastener hole and interior surfaces of the cutout are covered by a shrink fit sleeve repair.

6. The symmetrical rib structure of claim 1, wherein a single row of fasteners are installed in the flange along the web center plane of the structural web.

7. The symmetrical rib structure of claim 1, wherein the symmetrical rib structure is installed in an aircraft wing.

8. The symmetrical rib structure of claim 1, further comprising a single fastener in the shear tie foot.

9. A method for configuring a symmetrical rib structure:
configuring a structural web comprising a plurality of web stiffeners, wherein the structural web and the plurality of web stiffeners are arranged symmetrical about a web center plane such that the symmetrical rib structure has a first side relative to the web center plane and a second side opposite the first side relative to the web center plane;
configuring a flange configured on a periphery of the symmetrical rib structure
configuring a fastener hole configured in the flange and comprising a fastener hole centerline aligned with the web center plane;
configuring a cutout in the structural web around the fastener hole, wherein the cutout comprises a shear tie cutout and the flange comprises a shear tie foot; and
configuring two shear tie support columns coupled to the flange on opposite sides of the cutout and a structural web chord arranged on an opposite side of the cutout from the flange.

10. The method of claim 9, further comprising configuring the cutout to define a volume sized to accept a fastener and a tooling component to fasten the fastener.

11. The method of claim 9, further comprising covering interior surfaces of the cutout and the fastener hole by a shrink fit sleeve repair.

12. The method of claim 9, further comprising installing a single row of fasteners in the flange along the web center plane of the structural web of the symmetrical rib structure.

13. The method of claim 9, further comprising installing the symmetrical rib structure in an aircraft wing.

14. The method of claim 9, further comprising at least one fastener in the flange.

15. A method for single sided fastening of a symmetrical rib structure, the method comprising:
positioning a symmetrical rib structure in an assembly location, the symmetrical rib structure comprising:
a structural web comprising a plurality of web stiffeners, wherein the structural web and the plurality of web stiffeners are arranged symmetrical about a web center plane;
an assembly side comprising one of: a first side of the symmetrical rib structure relative to the web center plane, or a second side of the symmetrical rib structure opposite the first side relative to the web center plane;
a flange configured on a periphery of the symmetrical rib structure;
a fastener hole from a plurality of fastener holes configured in the flange and comprising a fastener hole centerline aligned with the web center plane;
a cutout configured in the structural web around the fastener hole, wherein the cutout comprises a shear tie cutout and the flange comprises a shear tie foot; and
two shear tie support columns coupled to the flange on opposite sides of the cutout and
a structural web chord;
inserting a fastener from a plurality of fasteners into the cutout in the symmetrical rib structure from only the assembly side;
positioning the fastener in the fastener hole from only the assembly side;
inserting a fastener tool into the cutout in the symmetrical rib structure from only the assembly side;
coupling the fastener tool to the fastener; and
operating the fastener tool from only the assembly side to couple the fastener to one or more objects.

16. The method of claim 15, further comprising installing a single row of the plurality of fasteners in the flange along the web center plane of the structural web of the symmetrical rib structure.

17. The method of claim 15, further comprising installing the symmetrical rib structure in an aircraft wing.

* * * * *